Jan. 19, 1943. R. J. BRECKHEIMER 2,309,043
FLOAT VALVE AND HUMIDIFIER CONSTRUCTION
Filed Aug. 4, 1941 2 Sheets-Sheet 1

INVENTOR.
RAYMOND J. BRECKHEIMER
BY
ATTORNEY.

Jan. 19, 1943. R. J. BRECKHEIMER 2,309,043
FLOAT VALVE AND HUMIDIFIER CONSTRUCTION
Filed Aug. 4, 1941 2 Sheets-Sheet 2
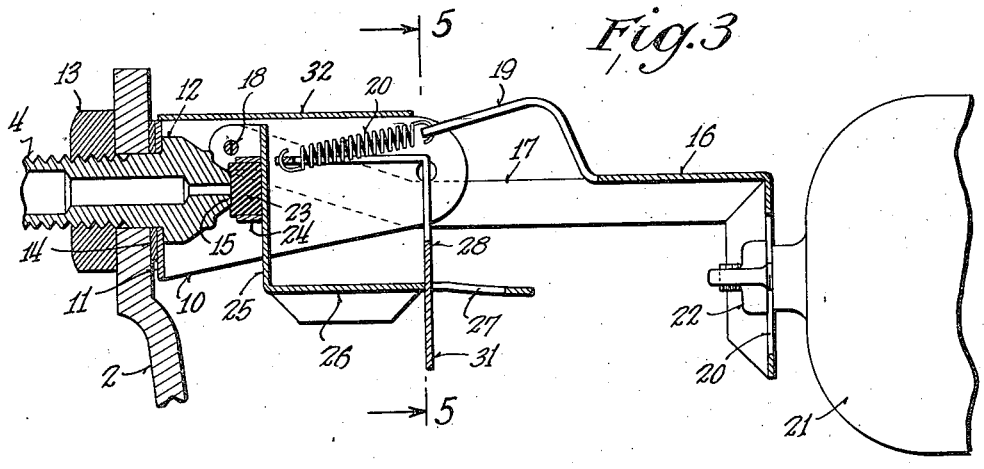
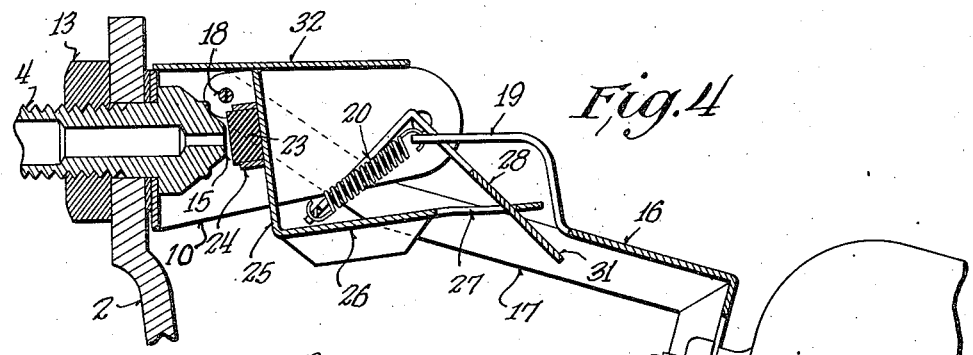
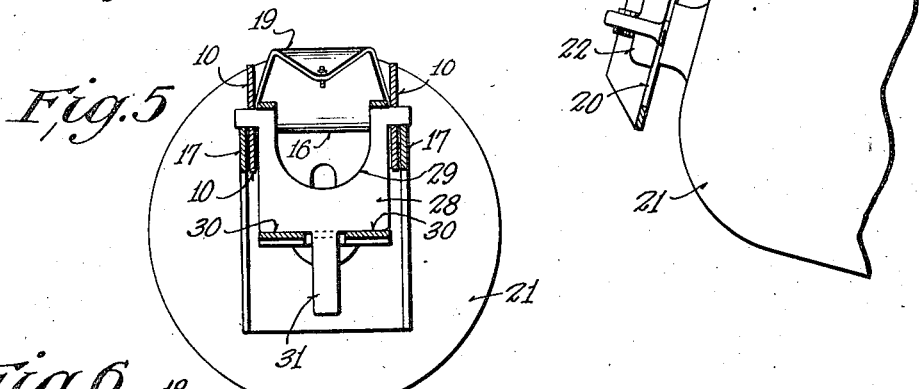
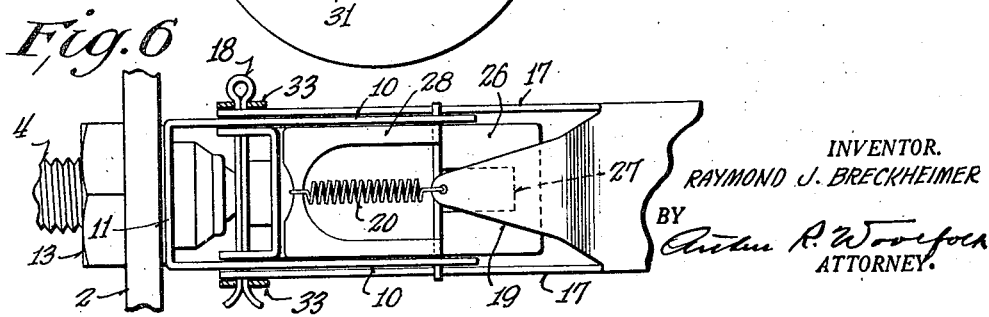
INVENTOR.
RAYMOND J. BRECKHEIMER
BY
ATTORNEY.

Patented Jan. 19, 1943

2,309,043

UNITED STATES PATENT OFFICE 2,309,043

FLOAT VALVE AND HUMIDIFIER CONSTRUCTION

Raymond J. Breckheimer, Milwaukee, Wis., assignor to Edwin H. Berge, Milwaukee, Wis.

Application August 4, 1941, Serial No. 405,316

14 Claims. (Cl. 137—104)

This invention relates to a float valve and to a humidifier construction.

Objects of this invention are to provide a float valve which snaps open and which snaps closed and is either in the fully open position or in the fully closed position so that there is a full and free flow of liquid through the orifice of the valve which cleans the valve out at each operation, and so that there is no wire drawing or slow leak which invariably results in damaging the valve.

Further objects are to provide a float valve in which a light standard type float can be used, which does not have to be weighted, and in which the valve is locked in closed position and is not held closed through the action of the float.

Further objects are to provide a humidifier construction in which an evaporating pan and a float valve chamber are provided which are distinct and separate and are connected in such a manner as to prevent hot water from backing up into the float valve chamber which would cause liming and deposit formation in the float valve chamber and would also cause deterioration of the valve due to the action of the hot water.

Further objects are to provide a float valve construction which is very simple, which is cheap to make, and which has a very long life.

An embodiment of the invention is shown in the accompanying drawings, in which:

Figure 3 is a sectional view showing the float valve in closed position.

Figure 4 is a view corresponding to Figure 3 showing the float valve in open position.

Figure 5 is a sectional view on the line 5—5 of Figure 3.

Figure 6 is a fragmentary plan view of a portion of the float valve, with parts sectioned off.

The particular embodiment chosen for illustrating the invention shows the valve used in a humidifier. It is to be distinctly understood, however, that the float valve may be used, not only in a humidifier, but in any capacity where it is desired to control the level of a liquid, such for instance as a toilet float valve, an oil burner float valve, a water trough or feeding trough float valve, or, as stated, in any other capacity.

Figure 1:
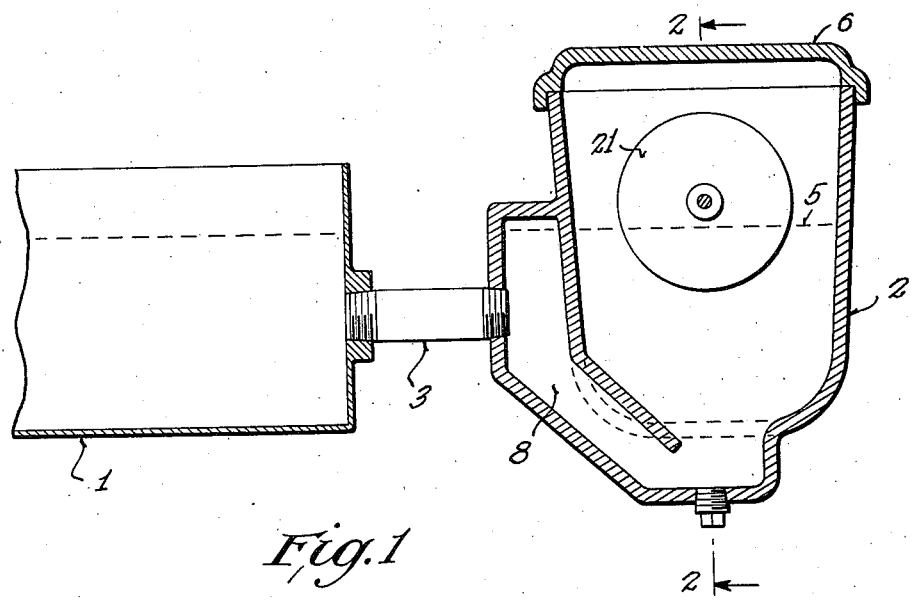
Figure 1 is a fragmentary sectional view through an evaporating pan and float chamber of a humidifier in which the snap action float valve is employed, such figure corresponding to a section on the line 1—1 of Figure 2.
Figure 2:
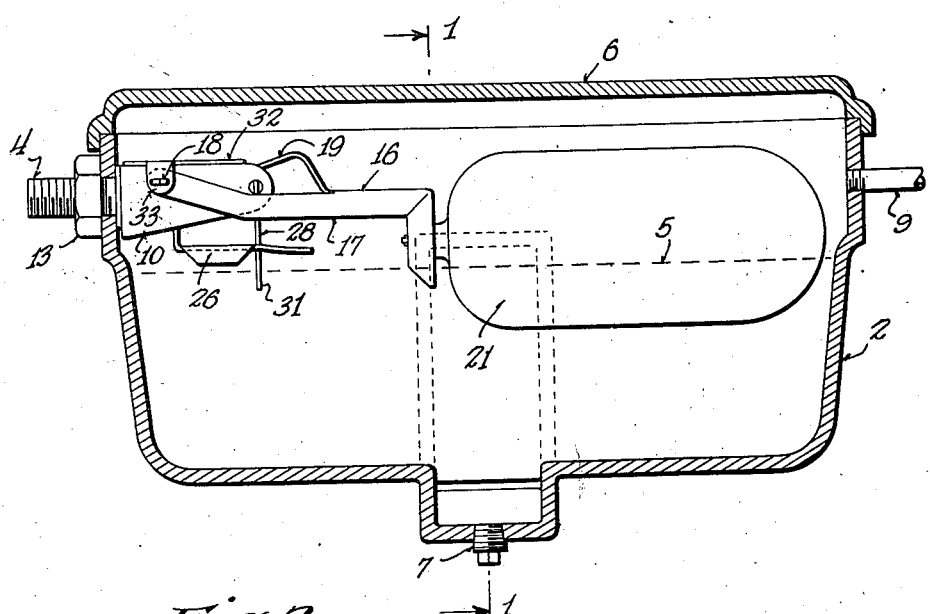
Figure 2 is a sectional view on the line 2—2 of Figure 1.

Referring to the drawings in which the float valve has been illustrated in one of its many applications as applied to a humidifier, it will be seen from Figures 1 and 2 that an evaporating pan 1 has been illustrated which is adapted to be mounted within the hood of a furnace or in a similar place and that this evaporating pan is connected with the float chamber 2 by means of a pipe 3. Preferably the float chamber 2 is located externally of the furnace. A water supply fitting 4 enters the float chamber 2 at a point above the highest water level indicated by the dotted line 5 in Figures 1 and 2. Preferably a removable cover 6 is provided for the float valve chamber as well as a drain plug 7.

It has been found that where the hot water reaches the valve proper within the float chamber that rapid deterioration of the valve occurs. This invention prevents the return of hot water to the float chamber. This result is secured by providing a trap in the form of a channel 8 which opens into the bottom of the float chamber and extends laterally thereof and upwardly to the pipe 3 as shown in Figure 1. It is obvious therefore that the hot water within the evaporating pan will not travel downwardly through the trap into the lower portion of the float chamber, as the pipe 3 enters the trap at a point far above the bottom opening into the float chamber.

It is preferable to provide an overflow means as indicated at 9 in Figure 2 above the water level.

Referring to Figures 3, 4 and 5, it will be seen that the snap action float valve is provided with a stationary portion in the form of two U-shaped arms 10 which are connected by a yoke portion 11 clamped in place by means of the fitting 4. This fitting is provided with a shouldered portion 12 which engages the yoke 11 and is provided with a projecting threaded portion upon which a clamping nut 13 is screwed. Preferably a suitable gasket as indicated at 14 is provided between the float chamber 2 and the yoke portion 11.

The fitting 4 terminates inwardly of the float chamber in a valve seat indicated generally at 15.

The float lever is indicated at 16 and is generally channel-shaped through a portion of its extent and is provided with a pair of rearwardly projecting arms 17 which are pivoted upon the split pin or pintle pin 18, such pin being carried by the arms 10 of the support. A lip 19 is struck up from the float lever 16 and is apertured and receives one end of a tensioned spring 20. The outer end of the float lever 16 is provided with a downwardly turned portion slotted as indicated at 20 through which the threaded stem of the float 21 projects, such float being locked in place by means of the wing nut 22. The float is a relatively light standard type float and the slotted adjustment is provided merely to determine the selected water level at which the device is designed to operate.

The valve is indicated at 23 and cooperates with the valve seat 15 to control the flow of water into the float chamber. This valve 23 may be of any suitable material, such as "neoprene" for instance, or may be of soft lead or other suitable material. It is preferably slightly yielding as compared with the valve seat 15. This valve is carried in a cup-shaped portion 24 formed on the valve lever 25. The valve lever 25 is pivoted on the same pin 18 as the float lever 16. This valve lever is provided with a portion 26 projecting approximately at right angles to the portion 25 and terminating in a slanting portion which slants downwardly at a slight angle with reference to the portion 26. This slanting portion may be slightly bowed, if so desired, as shown in the drawings. The portion 26 of the valve lever is slotted as indicated at 27.

An operating lever is provided and is indicated by the reference character 28. This operating lever has a bell crank shape as shown in Figure 3 and 4. It is cut out as indicated at 29 in Figure 5 and has its upper arm connected to the end of the spring 20 so that the spring is in tension between the lip or finger 19 of the float lever 16 and the bell crank operating lever 28.

This bell crank lever 28 is provided with shoulders 30, see Figure 5, and with a downwardly projecting tongue 31. The downwardly projecting tongue 31 passes through the slot 27 of the portion 26 of the valve lever. The operating lever is pivoted in the arms 10 at a point spaced from the pin 18 and is thus pivoted independently of the valve lever and float lever.

It is preferable to provide a hood 32 having a pair of downwardly projecting lips indicated at 33 in Figures 2 and 6. These lips are apertured and the pintle pin 18 passes therethrough to hold the hood in place.

The operation of the snap action float valve is as follows: Assuming that the valve is in its closed position, as shown in Figures 1, 2 and 3, it is obvious that as the water level descends, the float will descend and will move the float lever 16 downwardly. This has no effect on the operating lever 28 until the outer end of the spring 20 is carried past dead center with reference to the operating lever 28, at which time the operating lever 28 will suddenly snap or rock into the position shown in Figure 4 and thus release the valve lever 25, 26, thus allowing the valve lever to move to fully open position under the action of the water pressure. However, this water pressure is not the only agency which opens the valve. The tongue 31 will suddenly strike the end portion of the lever 26, as shown in Figure 4, as the slot 27 terminates short of the outer end of the lever 26. This will strike a blow upwardly against the outer end of the lever 26 and will positively drive the valve lever to fully open position.

Assume now that the water level rises as the device is supplied with water through the fitting 4 as the valve is in fully open position. As the float rises, no effect is produced on the operating lever 28 until the outer end of the spring 20 is carried upwardly past dead center with reference to the operating lever 28. At this time the operating lever 28 suddenly snaps or rocks back to the position shown in Figure 3 and thus suddenly and fully closes the valve.

It is to be noted that the operating lever 28 has a wedging action against the valve lever and inasmuch as the valve lever is made of slightly springy sheet metal, it is apparent that the valve lever is slightly sprung and also it is apparent, as shown in Figure 3, that the yielding valve seat 23 is slightly compressed.

It is to be noted that the valve is either fully open or fully closed.

In addition to this feature, it is to be noted that the valve is locked closed independently of the spring 20 and of the float 21. The device is so made that when the valve is closed, the downwardly extending arm of the operating lever 28 is at right angles to the adjacent portion of the valve lever 26 and thus locks the valve lever in valve closed position independently of the spring 20 or the float 21. There is a wedging action that takes place in the closing of the valve due to the fact that the shouldered portions 30 of the operating lever 28, see Figure 5, ride along the slanting portion of the valve lever 26.

A further feature to be noted from reference to Figures 3 and 4 is that the weight of the float never operates against the action of the spring 20. The spring 20 is always in such a position that it pulls downwardly upon the float lever and thus urges the float downwardly. Thus it is possible to use a light standard type float and it is not necessary to use a weighted float. In addition to this, it is to be noted that the spring 20 makes a slight angle with reference to the float lever 16 when the valve is closed and in Figure 4 makes a large angle with the float lever when the valve is open.

Thus there is a greater downward pull on the float when the valve is in open position than when the valve is in closed position. This causes the float to be more deeply submerged as the water level rises when the parts start from the position shown in Figure 4 than when the valve is in cut off position as shown in Figure 3. This gives an additional spring action to the apparatus for when the float carries the outer end of the spring 20 upwardly past dead center, this downward pull is considerably relieved and consequently the float moves upwardly at an accelerated rate.

It is apparent that inasmuch as the valve always opens fully and always fully closes with a quick or snap action, wire drawing cannot result and consequently deterioration of the valve is greatly reduced. This prolongation of the life of the valve is enhanced by the peculiar construction of the float chamber wherein a trap is provided, as previously described, to prevent the hot water from reaching the valve. It is well known that hot water rapidly deteriorates these valves and therefore this additional protection is afforded.

It will be seen further that most of the parts of the snap action float valve are formed from stampings and that all of the parts are relatively simple and are easy to produce.

It is to be distinctly understood that the snap action float valve is intended to be used in any of many different capacities. It has been shown as used with a humidifier but it is not intended that the invention be limited to this use alone as the valve may be used, as previously stated, in any service where the liquid level is to be automatically controlled.

Although this invention has been described in considerable detail, it is to be understood that such description is intended as illustrative rather than limiting, as the invention may be variously embodied and is to be interpreted as claimed.

I claim:

1. A float valve comprising a valve seat, a pivoted valve lever having a valve adapted to seat on said valve seat, quick action mechanism including an operating lever pivoted at a point spaced from the pivot point of said valve lever for moving said valve lever to valve open and valve closed position and having an arm which, when said valve is closed, wedges against a portion of said valve lever and locks said valve lever in valve closed position when said operating lever is in one position, said operating lever having a portion operatively conected to said valve lever for opening said valve when said operating lever is in another position, float means movable between an upper and a lower position, and a spring attached at one end to said operating lever, the other end of said spring being moved by said float means back and forth across dead center with reference to said operating lever as said float means rises and falls.

2. A float valve comprising a valve seat, a pivoted valve lever having a valve adapted to seat on said valve seat, quick action mechanism including an operating lever pivoted at a point spaced from the pivot point of said valve lever for moving said valve lever to valve open and valve closed position and having an arm which, when said valve is closed, wedges against a portion of said valve lever and forms substantially a right angle with such portion of said valve lever and locks said valve lever in valve closed position, float means movable between an upper and a lower position, said operating lever having a portion operatively connected to said valve lever for opening said valve when said float moves to said lower position, and a spring attached at one end to said operating lever, the other end of said spring being moved by said float means back and forth across dead center with reference to said operating lever as said float means rises and falls.

3. A quick opening and quick closing float valve comprising a valve seat, a valve lever pivoted adjacent said valve seat, a valve carried by said valve lever for cooperation with said valve seat, a snap action operating lever pivoted at a point spaced from the pivot point of said valve lever and having operative engagement with said valve lever to open and close said valve and having a portion wedging against and locking said valve lever against opening motion when said valve is in closed position, a spring having one end attached to said operating lever, and float means for moving the other end of said spring back and forth across dead center with reference to said operating lever.

4. A quick opening and quick closing float valve comprising a valve seat, a valve lever pivoted adjacent said valve seat, a valve carried by said valve lever for cooperation with said valve seat, a snap action operating lever pivoted at a point spaced from the pivot point of said valve lever and having operative engagement with said valve lever to open and close said valve and having a portion wedging against and locking said valve lever against opening motion when said valve is in closed position, a spring having one end attached to said operating lever, and float means for moving the other end of said spring back and forth across dead center with reference to said operating lever, said operating lever having a portion arranged to strike said valve lever to drive said valve lever to valve open position.

5. A float valve comprising a valve seat, a pivoted valve lever having a valve adapted to seat on said valve seat, quick action mechanism including an operating lever pivoted at a point spaced from the pivot point of said valve lever for moving said valve lever to valve open and valve closed position, said operating lever having a part for wedging against and positively locking said valve lever in valve closed position and having a part for engaging said valve lever to open said valve, float means movable between an upper and a lower position, and a spring attached at one end to said operating lever, the other end of said spring being moved by said float means back and forth across dead center with reference to said operating lever as said float means rises and falls.

6. A float valve comprising a valve seat, a pivoted valve lever having a valve adapted to seat on said valve seat, quick action mechanism including an operating lever pivoted at a point spaced from the pivot point of said valve lever for moving said valve lever to valve open and valve closed position, said operating lever having a first part for wedging against and positively locking said valve lever in valve closed position, float means movable between an upper and a lower position, and a spring attached at one end to said operating lever, the other end of said spring being moved by said float means back and forth across dead center with reference to said operating lever as said float means rises and falls, said operating lever having a second part having operative connection with said valve lever for positively moving said valve lever to valve open position.

7. A float valve comprising a valve seat, a pivoted valve lever having a valve adapted to seat on said valve seat, quick action mechanism including an operating lever pivoted at a point spaced from the pivot point of said valve lever for moving said valve lever to valve open and valve closed position, said operating lever having a first part for wedging against and positively locking said valve lever in valve closed position, float means movable between an upper and a lower position, and a spring attached at one end to said operating lever, the other end of said spring being moved by said float means back and forth across dead center with reference to said operating lever as said float means rises and falls, said operating lever having a second part which strikes said valve lever and positively moves said valve lever to valve open position.

8. A float valve comprising a valve seat, a pivoted valve lever, a valve operated by said valve lever and adapted to seat on said valve seat, quick action mechanism including an operating lever pivoted at a point spaced from the pivot point of said valve lever and movable to a first position to move said valve lever to valve open position and movable to a second position to move said valve lever to valve closed position, said operating lever having a first part for wedging against and positively locking said valve lever in valve closed position and having a second part which strikes said valve lever to positively move said valve lever to valve open position, float means movable between an upper and a lower position, and a spring attached at one end to said operating lever, the other end of said spring being moved by said float means back and forth across dead center with reference to said operating lever as said float means rises and falls.

9. A float valve comprising a valve seat, a pivoted valve lever, a valve operated by said valve lever and adapted to seat on said valve seat, quick action mechanism including an operating lever pivoted at a point spaced from the pivot point of said valve lever and movable to a first position to move said valve lever to valve open position and movable to a second position to move said valve lever to valve closed position, said operating lever having a first part which has a wedging action with said valve lever for positively locking said valve lever in valve closed position and having a second part which strikes said valve lever to positively move said valve lever to valve open position, float means movable between an upper and a lower position, and a spring attached at one end to said operating lever, the other end of said spring being moved by said float means back and forth across dead center with reference to said operating lever as said float means rises and falls.

10. A float valve comprising a valve seat, a pivoted valve lever, a valve operated by said valve lever and adapted to seat on said valve seat, quick action mechanism including an operating lever pivoted at a point spaced from the pivot point of said valve lever for moving said valve lever to valve open and valve closed position, float means movable between an upper and a lower position, and a spring attached at one end to said operating lever, the other end of said spring being moved by said float means back and forth across dead center with reference to said operating lever as said float means rises and falls, said operating lever having a part for positively locking said valve lever in valve closed position by a wedging action against said valve lever and having a second part adapted to strike said valve lever to positively move said valve lever to valve open position.

11. A float valve comprising a valve seat, a pivoted valve lever, a valve operated by said valve lever and adapted to seat on said valve seat, quick action mechanism including an operating lever pivoted at a point spaced from the pivot point of said valve lever for moving said valve lever to valve open and valve closed position, float means movable between an upper and a lower position, and a spring attached at one end to said operating lever, the other end of said spring being moved by said float means back and forth across dead center with reference to said operating lever as said float means rises and falls, said operating lever having a part for positively locking said valve lever in valve closed position by a wedging action against said valve lever and having a second part adapted to strike said valve lever to positively move said valve lever to valve open position, said valve lever when locked in valve closed position being locked independently of said spring.

12. A float valve comprising a valve seat, a pivoted valve lever, a valve operated by said valve lever and adapted to seat on said valve seat, quick action mechanism including an operating lever pivoted at a point spaced from the pivot point of said valve lever for moving said valve lever to valve open and valve closed position, float means movable between an upper and a lower position, and a spring attached at one end to said operating lever, the other end of said spring being moved by said float means back and forth across dead center with reference to said operating lever as said float means rises and falls, said operating lever having a part for positively locking said valve lever in valve closed position by a wedging action against said valve lever and having a second part adapted to strike said valve lever to positively move said valve lever to valve open position, said valve lever when locked in valve closed position being locked independently of said spring and float means.

13. A float valve comprising a valve seat, a pivoted valve lever having a valve adapted to seat on said valve seat, quick action mechanism including an operating lever pivoted at a point spaced from the pivot point of said valve lever for moving said valve lever to valve open and valve closed position and having an arm which, when said valve is closed, wedges against a portion of said valve lever and locks said valve lever in valve closed position when said operating lever is in one position and having a portion which engages said valve lever for opening said valve when said operating lever is in another position, float means movable between an upper and a lower position, and a spring attached at one end to said operating lever, the other end of said spring being moved by said float means back and forth across dead center with reference to said operating lever as said float means rises and falls, said spring in all positions urging said float means downwardly.

14. A float valve comprising a valve seat, a pivoted valve lever, a valve operated by said valve lever and adapted to seat on said valve seat, quick action mechanism including an operating lever pivoted at a point spaced from the pivot point of said valve lever for moving said valve lever to valve open and valve closed position, float means movable between an upper and a lower position, and a spring attached at one end to said operating lever, the other end of said spring being moved by said float means back and forth across dead center with reference to said operating lever as said float means rises and falls, said operating lever having a part for positively locking said valve lever in valve closed position by a wedging action against said valve lever and having a second part adapted to strike said valve lever to positively move said valve lever to valve open position, said valve lever when locked in valve closed position being locked independently of said spring and said spring in all positions urging said float means downwardly.

RAYMOND J. BRECKHEIMER.